US012176629B2

(12) United States Patent
Zhang et al.

(10) Patent No.: US 12,176,629 B2
(45) Date of Patent: Dec. 24, 2024

(54) HOLOGRAPHIC ANTENNA AND ELECTRONIC DEVICE

(71) Applicants: Beijing BOE Sensor Technology Co., Ltd., Beijing (CN); BOE TECHNOLOGY GROUP CO., LTD., Beijing (CN)

(72) Inventors: Wei Zhang, Beijing (CN); Xiaobo Wang, Beijing (CN); Feng Qu, Beijing (CN); Zhifeng Zhang, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/023,078

(22) PCT Filed: Jun. 24, 2022

(86) PCT No.: PCT/CN2022/100940
§ 371 (c)(1),
(2) Date: Feb. 24, 2023

(87) PCT Pub. No.: WO2023/245590
PCT Pub. Date: Dec. 28, 2023

(65) Prior Publication Data

US 2024/0291148 A1 Aug. 29, 2024

(51) Int. Cl.
*H01Q 3/46* (2006.01)
*H01Q 9/04* (2006.01)
(Continued)

(52) U.S. Cl.
CPC ............. *H01Q 3/46* (2013.01); *H01Q 9/0414* (2013.01); *H01Q 13/10* (2013.01); *H01Q 15/0006* (2013.01); *H01Q 21/065* (2013.01)

(58) Field of Classification Search
CPC .. H01Q 1/38; H01Q 3/44-46; H01Q 15/0006; H01Q 9/0414; H01Q 13/10; H01Q 19/067; H01Q 21/065
See application file for complete search history.

(56) References Cited

U.S. PATENT DOCUMENTS 10,637,133 B2 * 4/2020 Lu .......................... H01Q 1/405
2015/0288063 A1 10/2015 Johnson et al.
2019/0190162 A1 6/2019 Ohtake et al.

FOREIGN PATENT DOCUMENTS

CN 107408761 A 11/2017
CN 109478715 A 3/2019
(Continued)

*Primary Examiner* — Hasan Islam
(74) *Attorney, Agent, or Firm* — HOUTTEMAN LAW LLC

(57) ABSTRACT

The present disclosure provides a holographic antenna and an electronic device, and belongs to the field of communication technology. The holographic antenna includes a resonant structure, which includes a first and a second dielectric substrate opposite to each other, a first electrode layer on a side of the first dielectric substrate close to the second dielectric substrate, a second electrode layer on a side of the second dielectric substrate close to the first dielectric substrate, and a tunable dielectric layer between the first and second electrode layers. The first electrode layer includes slit openings therein, and the second electrode layer includes patch electrodes thereon; orthographic projections of a slit opening and a patch electrode corresponding to each other on the first dielectric substrate at least partially overlaps with each other; and the orthographic projection of the slit opening on the first dielectric substrate at least includes an arc segment.

20 Claims, 4 Drawing Sheets

10

(51) Int. Cl.

| | |
|---|---|
| ***H01Q 13/10*** | (2006.01) |
| ***H01Q 15/00*** | (2006.01) |
| ***H01Q 21/06*** | (2006.01) |

(56) References Cited

FOREIGN PATENT DOCUMENTS

| | | | |
|---|---|---|---|
| CN | 112106252 | A | 12/2020 |
| CN | 112909454 | A | 6/2021 |

* cited by examiner

HOLOGRAPHIC ANTENNA AND ELECTRONIC DEVICE

TECHNICAL FIELD

The present disclosure relates to the field of communication technology, and in particular to a holographic antenna and an electronic device.

BACKGROUND

A liquid crystal holographic electrically controlled scanning array antenna is a beamforming antenna with a low profile and a low cost realized by applying the holographic control theory to a liquid crystal electrically controlled scanning antenna. The holographic technology is a technology which records information about an amplitude and a phase of an object by using the principle related to the wave interference and diffraction and reproduces a three-dimensional image of the object. A holographic antenna is an application of the holographic technology in the field of microwave engineering, and may obtain a desired radiation electromagnetic wave by recording and recovering an interference field of a reference electromagnetic wave and the desired radiation electromagnetic wave. The holographic antenna generally includes two parts: a feed source structure and a holographic structure. The feed source structure is used for transmitting a reference wave which can mutually interfere with the desired radiation electromagnetic wave, and the holographic structure is used for recording a distribution of the interference field. When the holographic antenna is operating, firstly, the interference field of the reference electromagnetic wave and the desired radiation electromagnetic wave is formed on a plane, then the distribution of the interference field is recorded by the holographic structure, and finally the holographic structure in which the distribution of the interference field is recorded is excited by the reference electromagnetic wave, to recover the desired radiation electromagnetic wave. In a case where an antenna unit has the capacity of regulating and controlling a radiation electromagnetic wave, the liquid crystal holographic electrically controlled scanning antenna can dynamically record various distribution of the interference field, to recover the desired radiation electromagnetic wave and to realize the beamforming.

In the prior art, a PIN diode, a variable capacitance diode, a ferrite and an electromagnetic medium (such as liquid crystals) are loaded to adjust the amplitude of an antenna radiation unit, so that compared with the PIN diode, the liquid crystal material has the continuous adjustability in realizing the beamforming at a certain frequency; compared with the variable capacitance diode, the liquid crystal material has a higher operating frequency and has a better performance in the Ku frequency band and above; compared with the ferrite material, the liquid crystal material has a lower loss, can be electrically controlled, which effectively avoids the heaviness of a magnetic control device. Therefore, the liquid crystal electrically controlled scanning antenna has a wide prospect in the application of a modern communication system due to the excellent performance of the liquid crystal material.

SUMMARY

The present disclosure is directed to at least one of the problems of the prior art, and provides a holographic antenna and an electronic device.

In a first aspect, an embodiment of the present disclosure provides a holographic antenna, including a resonant structure; the resonant structure includes a first dielectric substrate and a second dielectric substrate opposite to each other, a first electrode layer on a side of the first dielectric substrate close to the second dielectric substrate, a second electrode layer on a side of the second dielectric substrate close to the first dielectric substrate, and a tunable dielectric layer between the first electrode layer and the second electrode layer; and the first electrode layer is provided with a plurality of slit openings therein, and the second electrode layer is provided with a plurality of patch electrodes thereon; an orthographic projection of each slit opening on the first dielectric substrate at least partially overlaps with an orthographic projection of a corresponding patch electrode on the first dielectric substrate; and the orthographic projection of the slit opening on the first dielectric substrate at least includes an arc segment.

In some embodiments, the slit opening includes a first portion and a second portion connected to each other; and the first portion and the second portion are in central symmetry with respect to a midpoint of a position where the first portion and the second portion are connected to each other as a symmetry center.

In some embodiments, an outline of an orthographic projection of the slit opening on the first dielectric substrate includes a first side and a second side opposite to each other; an orthographic projection of each of the first side and the second side on the first dielectric substrate intersects with an orthographic projection of a corresponding patch electrode on the first dielectric substrate; and the first side and the second side each have an S shape.

In some embodiments, orthographic projections of the slit opening and the patch electrode corresponding to each other on the first dielectric substrate overlap with each other; and an orthographic projection of a center of the slit electrode on the first dielectric substrate coincides with an orthographic projection of a center of the patch electrode on the first dielectric substrate.

In some embodiments, the resonant structure includes a plurality of resonant units; each of the resonant units includes one slit opening and one patch electrode whose orthographic projections on the first dielectric substrate overlap with each other; the plurality of resonant units are arranged to form a plurality of sets of resonant units in a nested arrangement, and the resonant units in each set are arranged sequentially; a line connecting centers of the patch electrodes in each set of resonant units forms a first pattern; and centers of the first patterns formed by the patch electrodes of the plurality of sets of resonant units are the same.

In some embodiments, a distance between any two adjacent first patterns is a constant.

In some embodiments, a center of the first pattern is a feed point of the hologram antenna; and in a first set of resonant units in a direction from the feed point to an edge of the first dielectric substrate, a distance between centers of any two adjacent patch electrodes is equal to a distance between any two adjacent first patterns.

In some embodiments, in a second set to a last set of the resonant units in the direction from the feed point to the edge of the first dielectric substrate, a distance between centers of any two adjacent patch electrodes in a set of the resonant units closer to the feed point is greater than that in a set of the resonant units farther from the feed point.

In some embodiments, the holographic antenna further includes a waveguide feed structure which is configured to transmit an electromagnetic wave to the resonant structure.

In some embodiments, the waveguide feed structure includes a reflective component, and a first reference electrode layer, a first support layer, a second reference electrode layer and a second support layer arranged sequentially close to the resonant structure; the reflective component has an accommodating space in which at least the first support layer, the second reference electrode layer and the second support layer are arranged; and an electromagnetic wave transmitted through the first support layer is irradiated onto a sidewall of the reflective component and is reflected to the second support layer and is transmitted to the resonant structure In some embodiments, the sidewall of the reflective component is arc-shaped.

In some embodiments, the reflective component and the first reference electrode layer have a one-piece structure.

In some embodiments, the waveguide feed structure further includes an absorptive load in the second support layer.

In some embodiments, the waveguide feed structure includes a coaxial connector which is configured to feed an electromagnetic wave into the first support layer.

In a second aspect, an embodiment of the present disclosure provides an electronic device, which includes the holographic antenna in any one of the above embodiments.

DETAIL DESCRIPTION OF EMBODIMENTS

In order to enable one of ordinary skill in the art to better understand the technical solutions of the present disclosure, the present invention will be described in further detail with reference to the accompanying drawings and the detailed description.

Unless defined otherwise, technical or scientific terms used herein shall have the ordinary meaning as understood by one of ordinary skill in the art to which the present disclosure belongs. The terms “first”, “second”, and the like used in the present disclosure are not intended to indicate any order, quantity, or importance, but rather are used for distinguishing one element from another. Further, the term “a”, “an”, “the”, or the like used herein does not denote a limitation of quantity, but rather denotes the presence of at least one element. The term of “comprising”, “including”, or the like, means that the element or item preceding the term contains the element or item listed after the term and its equivalent, but does not exclude other elements or items. The term “connected”, “coupled”, or the like is not limited to physical or mechanical connections, but may include electrical connections, whether direct or indirect connections. The terms “upper”, “lower”, “left”, “right”, and the like are used only for indicating relative positional relationships, and when the absolute position of an object being described is changed, the relative positional relationships may also be changed accordingly.

Figure 1:
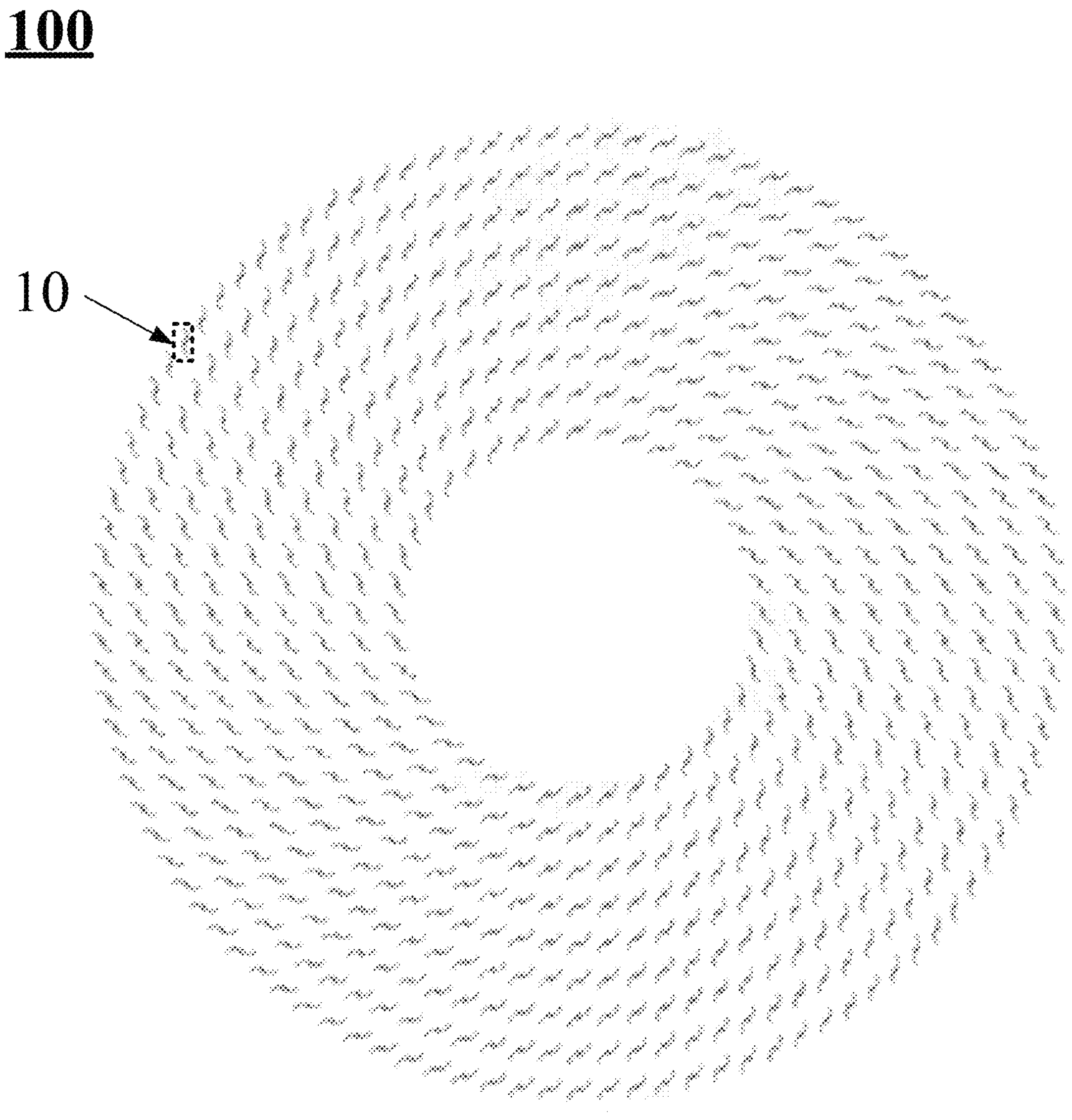
FIG. 1 is a top view of a resonant structure in a holographic antenna according to an embodiment of the present disclosure.
Figure 2:
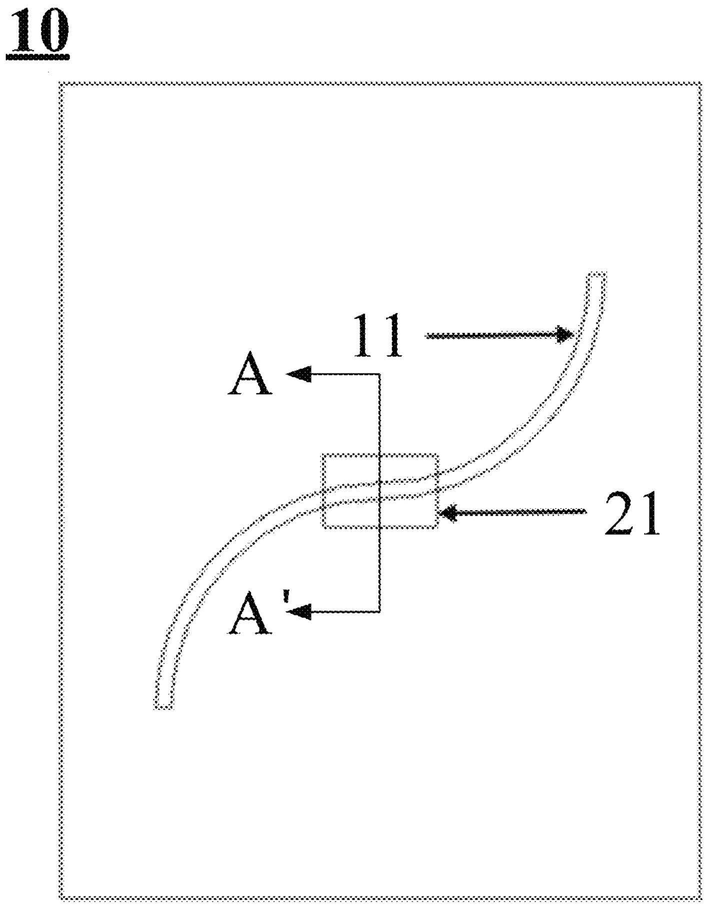
FIG. 2 is a schematic diagram of a resonant unit in a holographic antenna according to an embodiment of the present disclosure.
Figure 3:
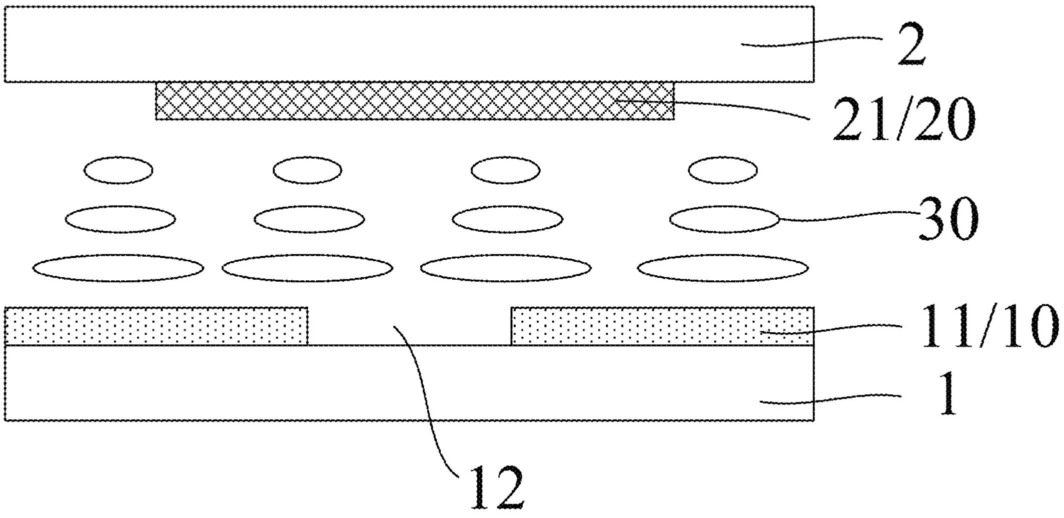
FIG. 3 is a cross-sectional view taken along a line A-A' of FIG. 2.

In a first aspect, FIG. 1 is a top view of a resonant structure 100 in a holographic antenna according to an embodiment of the present disclosure. FIG. 2 is a schematic diagram of a resonant unit 10 in a holographic antenna according to an embodiment of the present disclosure. FIG. 3 is a cross-sectional view taken along a line A-A' of FIG. 2.

As shown in FIGS. 1 to 3, an embodiment of the present disclosure provides a holographic antenna having a resonant structure 100. The resonant structure 100 includes a first dielectric substrate 1 and a second dielectric substrate 2 which are oppositely arranged, a first electrode layer 10 arranged on a side of the first dielectric substrate 1 close to the second dielectric substrate 2, a second electrode layer 20 arranged on a side of the second dielectric substrate 2 close to the first dielectric substrate 1, and a tunable dielectric layer arranged between the first electrode layer 10 and the second electrode layer 20. The tunable dielectric layer includes, but is not limited to, a liquid crystal layer. As an example, in the embodiments of the present disclosure, the tunable dielectric layer is the liquid crystal layer. The first electrode layer 10 is provided with a plurality of slit openings 11 therein, and the second electrode is provided with a plurality of patch electrodes 21 thereon. An orthographic projection of each slit opening 11 on the first dielectric substrate 1 at least partially overlaps with an orthographic projection of a corresponding patch electrode 21 on the first dielectric substrate 1. For example: the slit openings 11 and the patch electrodes 21 are provided in a one-to-one correspondence. In particular, in the embodiment of the present disclosure, the orthographic projection of each slit opening 11 in the first electrode layer 10 on the first dielectric substrate 1 at least includes an arc segment.

It should be noted that in the embodiment of the present disclosure, the slit openings 11 are in a one-to-one correspondence with the patch electrodes 21 as an example. A pair of the slit opening 11 and the patch electrode 21 corresponding to each other forms one resonant unit 10 (or a patch-slit pair).

In the embodiment of the present disclosure, the slit openings 11 are disposed in the first electrode layer 10, and the second electrode layer 20 includes the patch electrodes 21 corresponding to the slit openings 11, so that after a voltage is applied to the first electrode layer 10 and the patch electrodes 21 of the second electrode layer 20, a deflection of liquid crystal molecules of the liquid crystal layer can be controlled through an electric field formed between the patch electrodes 21 and the first electrode layer 10, so as to change a dielectric constant of the liquid crystal layer, adjust a resonant frequency of each resonant unit 10, and further control an exit angle of an electromagnetic wave fed into the first electrode layer 10 through each slit opening 11, thereby realizing the beamforming. In the embodiment of the present disclosure, the orthographic projection of each slit opening 11 in the first electrode layer 10 on the first dielectric substrate 1 at least includes an arc segment, so that the coupling between the adjacent resonant units 10 can be effectively prevented, and the pointing of the target wave is more accurate.

Figure 4:
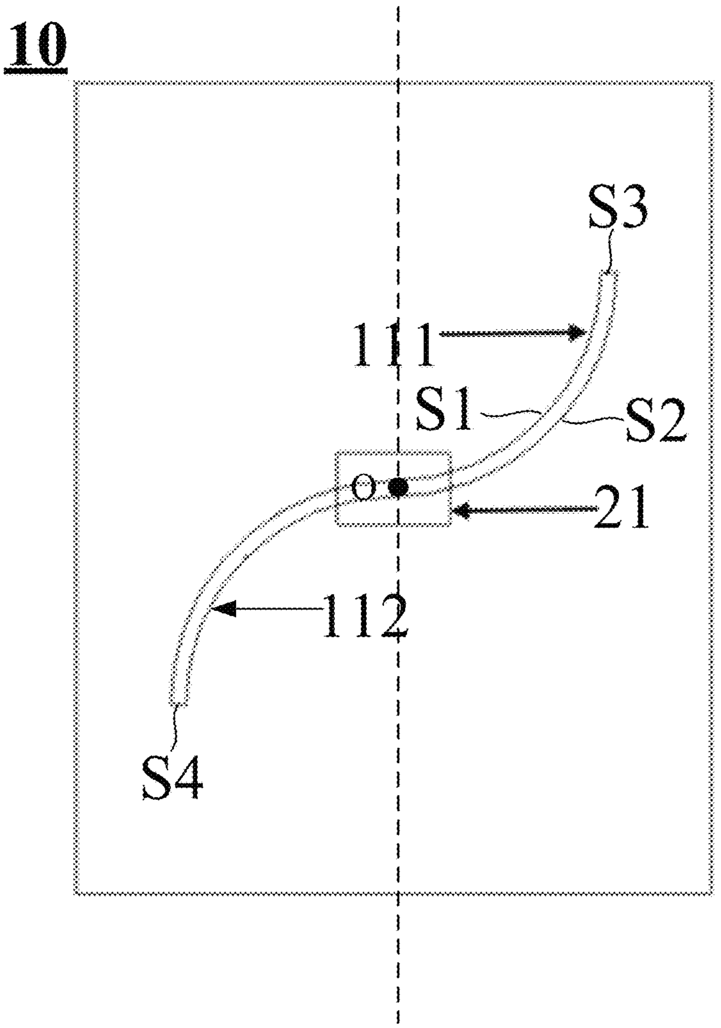
FIG. 4 is a schematic diagram of a first portion and a second portion of a resonant unit in a holographic antenna according to an embodiment of the present disclosure.

In some examples, FIG. 4 is a schematic diagram of a first portion and a second portion of a resonant unit 10 in a holographic antenna according to an embodiment of the present disclosure. As shown in FIG. 4, each slit opening 11 includes a first portion and a second portion connected to each other to form a one-piece structure. The first portion and the second portion are in central symmetry with respect to a midpoint of a position where the first portion and the second portion are connected to each other as a symmetry center. Further, for each resonant unit 10, a center of an orthographic projection of the patch electrode 21 on the first dielectric substrate 1 serves as a symmetric center of orthographic projections of the first portion and the second portion of the slit opening 11 on the first dielectric substrate 1. In this way, the coupling between the adjacent resonant units 10 can be effectively avoided.

In some examples, with continued reference to FIG. 4, an outline of an orthographic projection of the slit opening 11 on the first dielectric substrate 1 includes a first side S1 and a second side S2 that are oppositely disposed, and an orthographic projection of each of the first side S1 and the second side S2 on the first dielectric substrate 1 intersects with the orthographic projection of the patch electrode 21 on the first dielectric substrate 1. The first side S1 and the second side S2 each have an S shape. For example: both the first side S1 and the second side S2 are sine curves or cosine curves. Alternatively, the first side S1 and the second side S2 are not limited to the S shape, and may be semicircular or angular, or the like. The first side S1 and the second side S2 are both non-linear, so it can be understood that a shape of the slit opening 11 is irregular, and is not a regular pattern such as a rectangle. By providing the irregular openings in the first electrode layer 10, the coupling between the adjacent resonant units 10 can be effectively avoided.

Further, referring to FIG. 4, when the first side S1 and the second side S2 of the outline of the orthographic projection of the slit opening 11 on the first dielectric substrate 1 are both S-shaped, the slit opening 11 further includes a third side S3 and a fourth side S4 which are connected to the first side S1 and the second side S2 and are oppositely disposed. The first side S1 is parallel to the second side S2, and the third side S3 is parallel to the fourth side S4, where a center of the orthographic projection of the slit opening 11 on the first dielectric substrate 1 is a midpoint of a line connecting a midpoint of the first side S1 and a midpoint of the second side S2. For each resonant unit 10, the center of the orthographic projection of the slit electrode on the first dielectric substrate 1 coincides with a center of the orthographic projection of the patch electrode 21 on the first dielectric substrate 1.

Further, referring to FIG. 4, when the first side S1 and the second side S2 of the orthographic projection of the slit opening 11 on the first dielectric substrate 1 are both S-shaped, the slit opening 11 is divided into a first portion and a second portion by a straight line as a dividing line which passes through a center of the slit opening and is parallel to the third side S3 and the fourth side S4; and the first portion and the second portion are in central symmetry with respect to a center O of the slit opening 11 as a symmetric center. Therefore, a length of each slit opening 11 can be reduced, a size of the antenna can be effectively reduced, the number of the resonant units 10 of the antenna can be increased on the basis of limited size of the antenna, the sampling precision of the antenna can be improved, and the performance indexes such as the pointing precision of the antenna can be improved.

In some examples, the plurality of resonant units 10 in the resonant structure 100 are arranged to form a plurality of sets of resonant units 10 in a nested arrangement, and the resonant units 10 in each set are arranged sequentially. A line connecting centers of the patch electrodes 21 in each set of the resonant units 10 form a first pattern, and centers of the first patterns formed at this time are identical. For example: the formed first pattern is a circle, so that the first patterns form a concentric circle. Alternatively, the formed first pattern may be a rectangle, a square, a regular hexagon or the like. In the embodiments of the present disclosure, the formed first pattern is a circle as an example.

Further, a center of the first pattern serves as a feed point of the hologram antenna. A distance between the first patterns formed by the lines connecting the centers of the patch electrodes 21 of the any two adjacent sets of resonant units 10 is a constant and is in a range from ⅕ to 1/10 of a space wavelength (a sub-wavelength). In a set of resonant units 10 (hereinafter referred to as a first set of resonant units 10) in a direction from the feed point to an edge of the first dielectric substrate 1, a distance between the centers of any two adjacent patch electrodes 21 is equal to the distance between any two adjacent first patterns, that is, in a range from ⅕ to 1/10 of the space wavelength. In a second set to a last set of the resonant units 10 in the direction from the feed point to the edge of the first dielectric substrate 1, a distance between the centers of any two adjacent patch electrodes 21 in a set of the resonant units 10 closer to the feed point is greater than that in a set of the resonant units 10 farther from the feed point. In the embodiment of the present disclosure, it is ensured that each resonant unit 10 is perpendicular to a radial vector, and the radiation efficiency of the antenna can be effectively increased, thereby improving a main lobe gain and the radiation efficiency of the antenna.

In some examples, in the embodiments of the present disclosure, in addition to the above structure, the holographic antenna further includes a waveguide feed structure configured to transmit an electromagnetic wave to the resonant structure 100.

Figure 5:
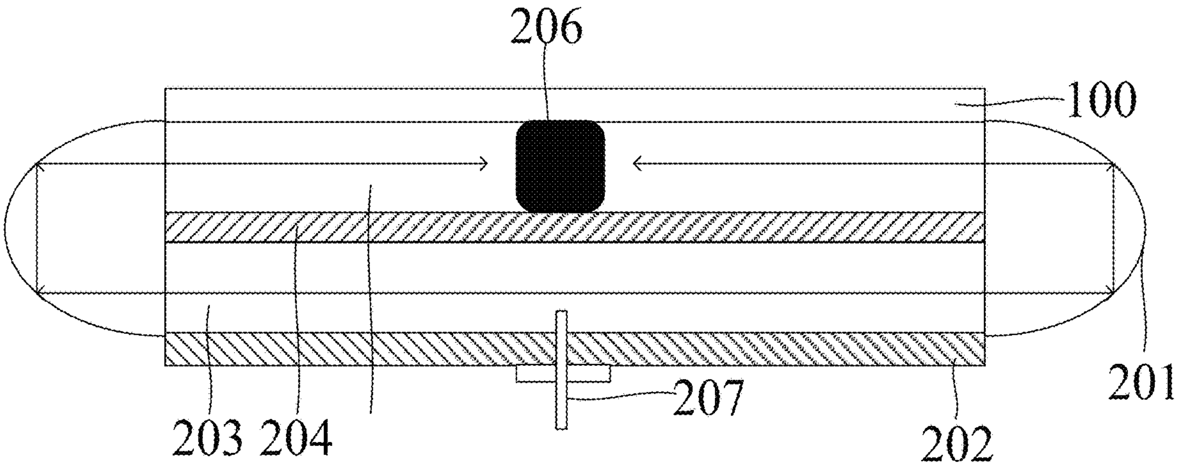
FIG. 5 is a schematic diagram of a holographic antenna according to an embodiment of the present disclosure.

In one example, FIG. 5 is a schematic diagram of a holographic antenna according to an embodiment of the present disclosure. As shown in FIG. 5, the waveguide feed structure includes a reflective component 201, and a first reference electrode layer 202, a first support layer 203, a second reference electrode layer 204 and a second support layer 205 arranged sequentially close to the resonant structure 100; the reflective component 201 has an accommodating space in which at least the first support layer 203, the second reference electrode layer 204 and the second support layer 205 are disposed; and an electromagnetic wave transmitted through the first support layer 203 is irradiated onto a sidewall of the reflective component 201 and can be reflected to the second support layer 205 and be transmitted to the resonant structure 100. The first reference electrode layer 202 and the second reference electrode layer 204 include, but are not limited to, a ground electrode layer. In the embodiment of the present disclosure, the first reference electrode layer 202 and the second reference electrode layer 204 are the ground electrode layer as an example.

Specifically, as shown in a traveling direction of the electromagnetic wave in FIG. 5, a central position of the first reference electrode layer 202 may be the feed point. The electromagnetic wave signal enters the first support layer 203 through the central position of the first reference electrode layer 202, is irradiated onto the reflective component 201, is reflected by the reflective component 201 to the second support layer 205, and finally enters the resonant structure 100 from the second support layer 205. A thickness of the first support layer 203 is required to be less than one-half wavelength of the operating frequency, in order to avoid the introduction of higher order modes. The reflective component 201 directs the electromagnetic wave signal from a side of the second reference electrode layer 204 to an opposite side of the second reference electrode layer 204. The second support layer 205 slows the interior of the waveguide by about 30% compared to a free space. A thickness of the second support layer 205 is required to be less than one-half wavelength of the operating frequency, in order to avoid the introduction of higher order modes. A material of the first support layer 203 and the second support layer 205 as a support structure, includes, but is not limited to, a foam, a plastic, a resin, or the like. Preferably, a dielectric constant of the material of the first support layer 203 and the second support layer 205 is the same as or similar to that of air, so as to reduce the transmission loss of microwaves.

With continued reference to FIG. 5, the sidewall of the reflective component 201 is arc-shaped. In this case, the electromagnetic wave transmitted in the first support layer 203 is irradiated onto the reflective component 201, so that the transmission direction of the electromagnetic wave is changed twice. Firstly, the electromagnetic wave is irradiated onto the sidewall of the reflective component 201 from the horizontal direction, which is the first change, that is, the transmission direction of the electromagnetic wave is changed from the horizontal direction to the vertical direction.

Then, the electromagnetic wave is irradiated onto the sidewall of the reflective component 201 again, which is the second change. That is, the transmission direction of the electromagnetic wave is changed from the vertical direction to the horizontal direction. Finally, the electromagnetic wave enters the second support layer 205.

It should be noted that in the embodiment of the present disclosure, the sidewall of the reflective component 201 is in an arc shape as an example. In some examples, a dihedral angle formed by the sidewall of the reflective component 201 can also cause the transmission direction of the electromagnetic wave irradiated onto the dihedral angle to be changed, so as to transmit the electromagnetic wave to the second support layer 205.

In some examples, the reflective component 201 and the first reference electrode layer 202 have a one-piece structure. In this case, the reflective component 201 and the first reference electrode layer 202 can be formed in one process, which is simple and is easily formed. Alternatively, the reflective component 201 may be a separate structure from the first reference electrode layer 202, and the reflective component 201 and the first reference electrode layer 202 are assembled together when the antenna is manufactured.

In some examples, an absorptive load 206 is also disposed in the second support layer 205. A center of the absorptive load 206 is disposed opposite to the feed point, and the absorptive load 206 is configured to absorb the remaining guided waves and prevent the electromagnetic wave from being reflected back to the waveguide feed structure to interfere with the normal radiation of the antenna. Further, a distance between an orthographic projection of the absorptive load 206 on the first dielectric substrate 1 and an orthographic projection of each of the patch electrodes 21 in the first set of resonant units 10 on the first dielectric substrate 1 is at least one-half wavelength of the operating frequency.

In some examples, in the embodiments of the present disclosure, in addition to the above structure, the waveguide feed structure further includes a coaxial connector 207. The coaxial connector 207 may be inserted into the first support layer 203 through the center of the first reference electrode layer 202 to feed the electromagnetic wave into the first support layer 203. An access point of the coaxial connector 207 is the feed point of the antenna. The coaxial connector 207 may be a probe.

In some examples, the holographic antenna in the embodiments of the present disclosure has a cylindrical shape, that is, the first support layer 203, the first reference electrode layer 202, the second support layer 205, the first dielectric substrate 1, and the second dielectric substrate 2 all have a cylindrical shape. The first support layer 203, the first reference electrode layer 202, the second support layer 205, the first dielectric substrate 1, and the second dielectric substrate 2 may all be disposed in parallel, thereby reducing the size of the antenna.

Figure 6:
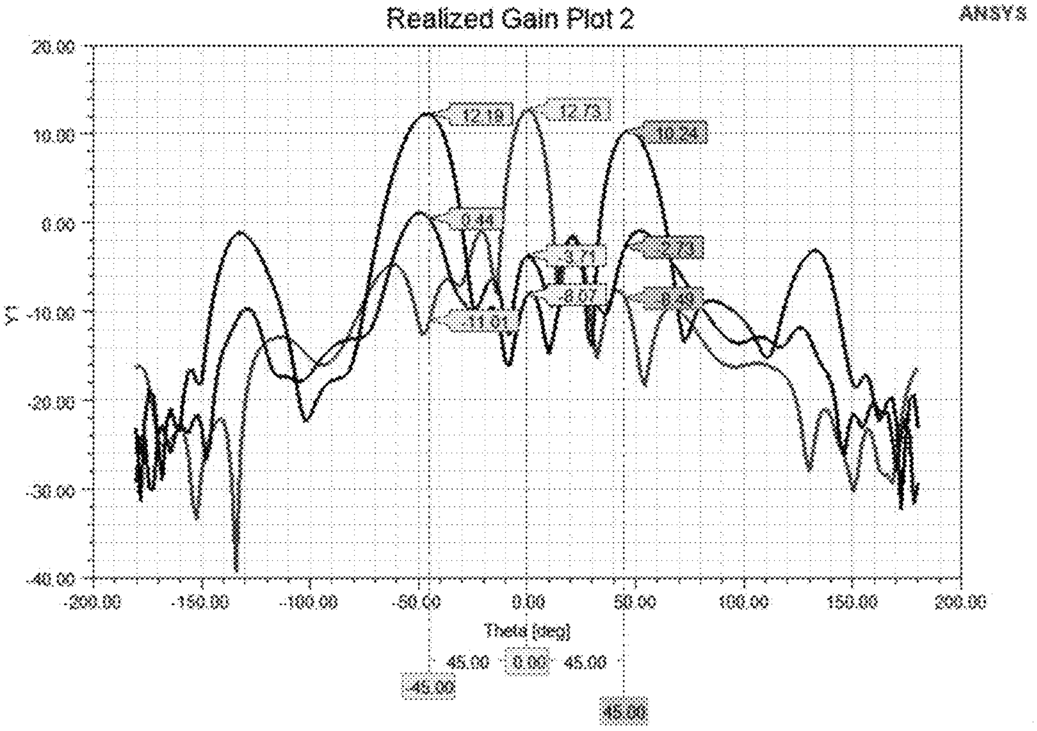
FIG. 6 is a directional diagram of a holographic antenna at theta=0 deg, ±45 deg according to an embodiment of the present disclosure.

In order to clearly understand the effect of the hologram antenna of the embodiment of the present disclosure, the hologram antenna shown in FIG. 5 is simulated. In the holographic antenna shown in FIG. 5, the resonant structure 100 may be the resonant structure 100 shown in FIG. 1, and the resonant unit 10 may specifically be the resonant unit 10 shown in FIG. 4. FIG. 6 is a directional diagram of a holographic antenna at theta=0 deg, ±45 deg according to an embodiment of the present disclosure. As shown in FIG. 6, the scanning of the beam can be achieved by controlling the voltages applied to the patch electrodes 21 of the resonant units 10 of the resonant structure 100.

In some examples, each patch electrode 21 in the second electrode layer 20 may be rectangular. Each patch electrode 21 is rectangular in the drawings of the embodiments of the present disclosure as an example. In actual products, each patch electrode 21 may also be in a circular shape, a circular ring shape, a triangular shape, or the like.

In some examples, a material of the first dielectric substrate 1 and the second dielectric substrate 2 may be quartz, glass, or other hard materials with low microwave loss.

In some examples, the tunable dielectric layer may be the liquid crystal layer, or other dielectrics with a tunable dielectric constant, such as graphene. A thickness of the liquid crystal layer has the influence on scanning time of beams. In view of that the beam switching time is in an order of millisecond, the thickness of the liquid crystal layer should not be great, and the thickness of the liquid crystal layer adopted in the embodiment of the present disclosure is about 35 um. The adjustable dielectric constants of different types of liquid crystals are different, and appropriate liquid crystals need to be adopted according to the required scanning angle for a beam of the antenna.

In some examples, the materials of the first electrode layer 10 and the second electrode layer 20 may be metals with a low resistance and a low loss, such as copper, gold or silver, and the first electrode layer 10 and the second electrode layer 20 may be formed through magnetron sputtering, thermal evaporation, electroplating or the like.

In a second aspect, the embodiment of the present disclosure provides an electronic device that may include the above holographic antenna. The holographic antenna further includes a transceiver unit, a radio frequency transceiver, a signal amplifier, a power amplifier, and a filtering unit. The antenna may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by the antenna in the communication system and is processed by the filtering unit, the power amplifier, the signal amplifier, and the radio frequency transceiver (not shown in the drawings), the transparent antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the transparent antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the transparent antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one antenna. In the process of transmitting signals by the communication system, the signal amplifier is used for improving a signal-to-noise ratio of the signals output by the radio frequency transceiver and then transmitting the signals to the filtering unit; the power amplifier is used for amplifying the power of the signals output by the radio frequency transceiver and then transmitting the signals to the filtering unit; the filtering unit specifically includes a duplexer and a filtering circuit, the filtering unit combines signals output by the signal amplifier and the power amplifier and filters noise waves and then transmits the signals to the transparent antenna, and the antenna radiates the signals. In the process of receiving signals by the communication system, the signals received by the antenna are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the antenna. The signals received by the antenna are processed by the power amplifier and the signal amplifier and then transmitted to the radio frequency transceiver, and the radio frequency transceiver transmits the signals to the transceiver unit.

In some examples, the signal amplifier may include various types of signal amplifiers, such as a low noise amplifier, without limitation.

In some examples, the antenna provided by the embodiments of the present disclosure further includes a power management unit connected to the power amplifier and for providing the power amplifier with a voltage for amplifying the signal.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A holographic antenna, comprising a resonant structure; wherein the resonant structure comprises a first dielectric substrate and a second dielectric substrate opposite to each other, a first electrode layer on a side of the first dielectric substrate close to the second dielectric substrate, a second electrode layer on a side of the second dielectric substrate close to the first dielectric substrate, and a tunable dielectric layer between the first electrode layer and the second electrode layer;

the first electrode layer is provided with a plurality of slit openings therein, and the second electrode layer is provided with a plurality of patch electrodes thereon;

an orthographic projection of each slit opening on the first dielectric substrate at least partially overlaps with an orthographic projection of a corresponding patch electrode on the first dielectric substrate; and the orthographic projection of the slit opening on the first dielectric substrate at least comprises an arc segment.

2. The holographic antenna of claim 1, wherein the slit opening comprises a first portion and a second portion connected to each other; and the first portion and the second portion are in central symmetry with respect to a midpoint of a position where the first portion and the second portion are connected to each other as a symmetry center.

3. The holographic antenna of claim 1, wherein an outline of an orthographic projection of the slit opening on the first dielectric substrate comprises a first side and a second side opposite to each other;

an orthographic projection of each of the first side and the second side on the first dielectric substrate intersects with an orthographic projection of a corresponding patch electrode on the first dielectric substrate; and the first side and the second side each have an S shape.

4. The holographic antenna of claim 1, wherein orthographic projections of the slit opening and the patch electrode corresponding to each other on the first dielectric substrate overlap with each other; and an orthographic projection of a center of the slit electrode on the first dielectric substrate coincides with an orthographic projection of a center of the patch electrode on the first dielectric substrate.

5. The holographic antenna of claim 1, wherein the resonant structure comprises a plurality of resonant units;

each of the resonant units comprises one slit opening and one patch electrode whose orthographic projections on the first dielectric substrate overlap with each other;

the plurality of resonant units are arranged to form a plurality of sets of resonant units in a nested arrangement; and the resonant units in each set are arranged sequentially;

a line connecting centers of the patch electrodes in each set of resonant units forms a first pattern; and centers of the first patterns formed by the patch electrodes of the plurality of sets of resonant units are the same.

6. The holographic antenna of claim 5, wherein a distance between any two adjacent first patterns is a constant.

7. The holographic antenna of claim 5, wherein a center of the first pattern is a feed point of the hologram antenna; and in a first set of resonant units in a direction from the feed point to an edge of the first dielectric substrate, a distance between centers of any two adjacent patch electrodes is equal to a distance between any two adjacent first patterns.

8. The holographic antenna of claim 7, wherein in a second set to a last set of the resonant units in the direction from the feed point to the edge of the first dielectric substrate, a distance between centers of any two adjacent patch electrodes in a set of the resonant units closer to the feed point is greater than that in a set of the resonant units farther from the feed point.

9. The holographic antenna of claim 1, further comprising a waveguide feed structure which is configured to transmit an electromagnetic wave to the resonant structure.

10. The holographic antenna of claim 9, wherein the waveguide feed structure comprises a reflective component, and a first reference electrode layer, a first support layer, a second reference electrode layer and a second support layer arranged sequentially close to the resonant structure;

the reflective component has an accommodating space in which at least the first support layer, the second reference electrode layer and the second support layer are arranged; and an electromagnetic wave transmitted through the first support layer is irradiated onto a sidewall of the reflective component, and is reflected to the second support layer, and is transmitted to the resonant structure.

11. The holographic antenna of claim 10, wherein the sidewall of the reflective component is arc-shaped.

12. The holographic antenna of claim 10, wherein the reflective component and the first reference electrode layer have a one-piece structure.

13. The holographic antenna of claim 10, wherein the waveguide feed structure further comprises an absorptive load in the second support layer.

14. The holographic antenna of claim 9, wherein the waveguide feed structure comprises a coaxial connector which is configured to feed an electromagnetic wave into the first support layer.

15. An electronic device, comprising the holographic antenna of claim 1.

16. The holographic antenna of claim 2, further comprising a waveguide feed structure which is configured to transmit an electromagnetic wave to the resonant structure.

17. The holographic antenna of claim 3, further comprising a waveguide feed structure which is configured to transmit an electromagnetic wave to the resonant structure.

18. The holographic antenna of claim 4, further comprising a waveguide feed structure which is configured to transmit an electromagnetic wave to the resonant structure.

19. The holographic antenna of claim 5, further comprising a waveguide feed structure which is configured to transmit an electromagnetic wave to the resonant structure.

20. The holographic antenna of claim 6, further comprising a waveguide feed structure which is configured to transmit an electromagnetic wave to the resonant structure.

* * * * *